United States Patent [19]
Pierce

[11] 4,112,793
[45] Sep. 12, 1978

[54] DEVICE FOR CUTTING OVALS IN MATS OR GLASS SHEETS

[76] Inventor: Donald Cameron Pierce, 1253 C Redwood Blvd., Novato, Calif. 94947

[21] Appl. No.: 785,244

[22] Filed: Apr. 6, 1977

[51] Int. Cl.² .................. B23B 41/04; B41L 11/04
[52] U.S. Cl. ............................................. 82/1.3; 83/464; 83/522; 83/523; 33/31
[58] Field of Search ............... 83/6, 464, 522, 523, 83/565; 33/30 F, 31; 82/1.3

[56] References Cited
U.S. PATENT DOCUMENTS

| | | | |
|---|---|---|---|
| 532,155 | 1/1895 | Hottinger | 33/31 |
| 884,762 | 4/1908 | Risting et al. | 33/31 |
| 3,845,676 | 11/1974 | Pierce | 83/523 X |

*Primary Examiner*—Donald R. Schran
*Attorney, Agent, or Firm*—Owen, Wickersham and Erickson

[57] ABSTRACT

A device for cutting ovals or circles in sheet material. A baseboard is secured adjustably atop a parallel pair of base channels by a combination of screws and coil springs. A base plate secured to one end of the baseboard supports (1) a pair of swivel-mounted hold-down arms and hold-down pads having swivel-mounted, spring-urged pads; (2) a tee bar with a slidably mounted scaled flat shank portion and a crossbar with a center index line; and (3) an upright frame member. The upright frame member supports a horizontal frame member extending forward over the baseboard and having a pair of spaced-apart transverse guide bars with a longitudinal opening extending in between them. A circular disc is mounted for rotation by a handle, within and tangent to the transverse guide bars, and the disc has a slot extending radially from about the center out toward the circumference of the disc. A compound bearing member is mounted for both rotation and lengthwise movement in the longitudinal opening and also is set to a chosen position in the slot which determines the eccentricity of the oval to be cut. Attached thereto, below the disc, is a rotatable member with a depending clamp. A calibrated bar is adjustably mounted in the clamp and rotates with it. Depending from the bar is a cutter assembly that carries a knife or glass cutter for cutting the oval in the mat or glass.

20 Claims, 11 Drawing Figures

DEVICE FOR CUTTING OVALS IN MATS OR GLASS SHEETS

BACKGROUND OF THE INVENTION

This invention relates to a device primarily for cutting carboard mats or incising glass sheets to provide ovals and circles, either as an outer boundary or as an opening.

Oval mat cutters have been on the market for years, and under favorable circumstances, and when handled by a highly skilled expert, they have been fairly satisfactory. However, there have been a good many problems with them, especially when handled under less than ideal conditions and by operators that are not highly skilled, and also there have been problems in their maintenance.

Several of these problems were solved by my earlier invention, described and claimed in U.S. Pat. No. 3,845,676, many features of which are incorporated in the present invention.

However, that invention was relatively expensive to manufacture because of the complexity and the precision required in the portion of the machine causing the elliptical movement of the cutter assembly.

An object of the present invention is to provide a simpler device for generating the elliptical movement of the cutter assembly — a device that can be made quite precise but which is inherently less expensive even though just as precise as the other device.

Another object is to provide an oval cutter that is better adapted for generating small oval openings than was heretofore the case.

SUMMARY OF THE INVENTION

The oval-cutting device of the present invention comprises a base made up of a baseboard that is preferably secured on top of a parallel pair of base channels by means of screws with yieldable coil springs lying between the channels and baseboard, to enable adjustment of the baseboard to make it parallel to the cutter blade. This is important in securing perfect cuts and also enables the user to compensate for an installation where the base channels cannot conveniently be set in a perfectly level fashion.

At one end of the baseboard, secured to the base channels, is a frame assembly which holds all the remaining parts of the machine. This structure enables the placing of large mats on the baseboard since there is only one limiting obstruction, the frame assembly at one end of the device.

A pair of hold-down arms is provided, swivel-mounted to the frame assembly, one adjacent each side of the frame assembly, and these hold-down arms are provided with hold-down pads at their distal ends. The pads are swivel-mounted to their respective arms and are urged toward the baseboard by springs. This type of hold-down structure is easy to release and easy to adjust. It can be used to engage any size of material which is being cut and can do so without any interference with the cutting operation. It means that the user, once having set his mat or glass sheet in place, does not have to concern himself with whether the material will slip, because once the hold-down pads are properly located, there will be no such slippage.

Another important feature of the invention is a horizontal tee bar, which is preferably located with its shank perpendicular to the frame assembly and slidable over the baseboard, along the longitudinal axis of the baseboard. The tee bar has a scale reflecting the distance from the edge of the mat to the center of the oval or circle to be cut. The crossbar of the tee is provided with an index line. The tee bar is important in making the operation of the invention simple; it enables the operator to work without having to draw any lines on the baseboard or having to do any calculations other than the simplest.

The actual cutting assembly is supported by an upper portion of the frame assembly. Thus, there may be a pair of upwardly-extending frame members having at their upper end a horizontal frame member that extends out over the baseboard.

This horizontal frame member has a pair of transverse members, one of them at approximately the distal end of the horizontal member and the other spaced from it, back toward the opposite end. In between these two members lies a longitudinally-extending slot, preferably having rounded ends.

A circular disc is mounted rotatably in between and tangent to the transverse members. This disc has a radially-extending slot lying mainly to one side of the center of the disc and has a handle that lies on the other side of the center of the disc. It may also have a circular opening through it lying beyond the end of this radially-extending slot.

An assembly associated with these members includes a rotatable disc bearing which is rotatably and slidably mounted in the longitudinal slot of the horizontal frame member and which has an extension on its upper face that fits non-rotatably but slidably into the radially-extending slot of the circular disc. The assembly includes a clamp for setting the extension into any of a series of selected positions in the radially-extending slot to provide a chosen amount of eccentricity to the oval which is to be cut. The assembly also includes a depending member that rotates with the disc bearing and which has another clamp means dependent therefrom.

The combination of the disc, the transverse members, the two slots, the bearing with its two portions engaging the two slots, and the upper clamp— this combination results in the disc being retained against movement along the longitudinal axis of the horizontal frame member when the disc rotates; further, depending on the position of the upper clamp and the bearing it clamps, there is lateral movement of the disc relative to the horizontal frame member.

A calibrated cutter holder bar is slidably mounted in this second clamp means so that it can be moved to a chosen position there which determines the minor diameter of the oval and then clamped by the second clamp means to hold it in that position.

A cutter assembly is mounted to depend from the calibrated cutter holding bar and to move therewith as the bar is rotated in an oval pattern. This cutter assembly includes a readily replaceable knife blade and in fact the knife blade may be replaced by a glass cutter when glass is to be cut. As a result, a type of blade may be used which is relatively inexpensive. An adjustable device determines how far down the blade can extend from the cutter holder bar. This device includes a yieldable spring arrangement so that the operator does not himself provide any downward pressure on the knife as he turns the handle on the disc to rotate the cutting assembly. All the cutting pressure is provided by the spring arrangement, thereby enabling the accommodation of various thicknesses of mats or glass sheets and placing the sheet under uniform cutting pressure.

Thus, the cutter holder bar is set in the clamp to give a desired minor diameter to the elipse, and the extension portion of the disc bearing is moved in the radial slot of the disc and clamped at a location where it results in a desired eccentricity, which can be zero if a circular opening is to be cut. With these simple settings a mat which is properly placed on the baseboard and held by the hold-down means is provided with an oval opening therethrough simply by turning the handle attached to the disc.

Other objects and advantages will appear from the following description of a preferred embodiment.

DETAILED DESCRIPTION OF A PREFERRED EMBODIMENT

Figure 1:
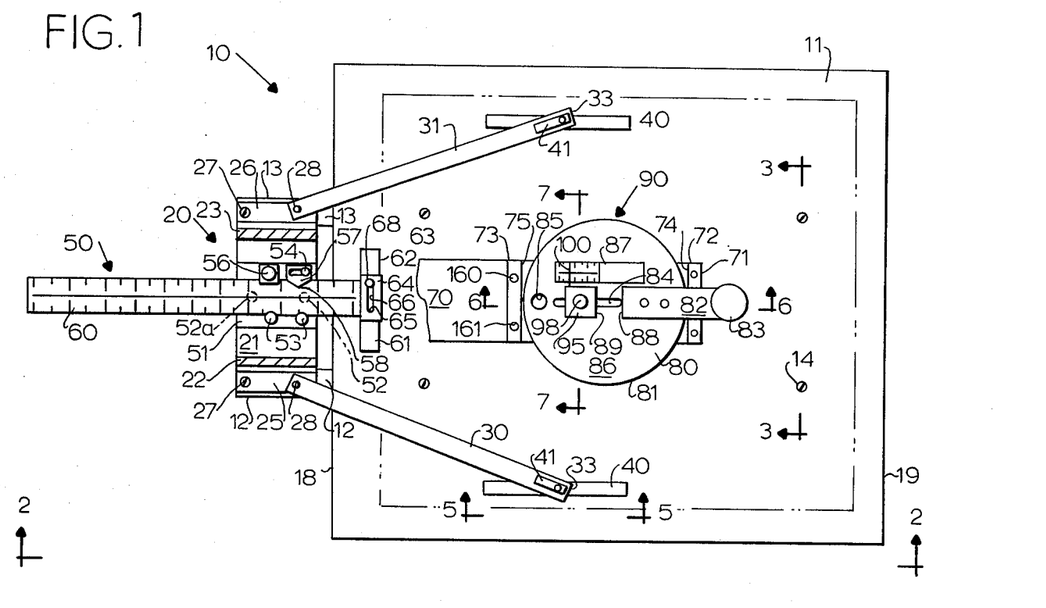
FIG. 1 is a top plan view of a device embodying the principles of the invention. A portion of the frame assembly has been cut away and shown in section in order to show the tee bar better.
Figure 2:
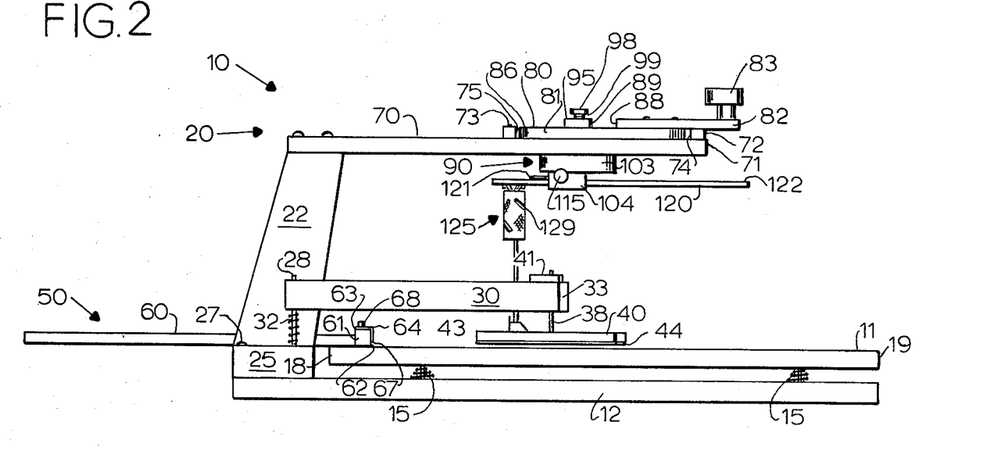
FIG. 2 is a view in side elevation and partly in section of the device of FIG. 1, taken along the line 2—2 in FIG. 1.
Figure 3:
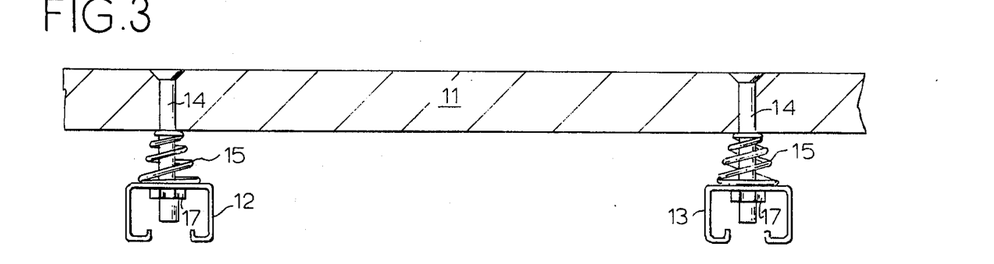
FIG. 3 is an enlarged fragmentary sectional view taken along the line 3—3 in FIGS. 1 and 2.

An oval cutter 10 embodying the principles of the invention is shown in FIGS. 1 and 2, some parts having been broken away in FIG. 1 so that parts that would otherwise be obscured can be seen. The cutter 10 comprises a baseboard 11, preferably rectangular, which may be made of wood or other suitable material and may be suitably surfaced. It rests on two base channels 12 and 13 which lie beneath it parallel to each other. The baseboard 11 is attached to the channels 12 and 13 by a plurality of bolts 14, as shown in FIG. 3. At each bolt 14, a rather stiff conical coil spring 15 may be provided between the baseboard 11 and the channel 12 or 13. Each spring 15 bears directly on the baseboard 11 and on the channel 12 or 13 and is compressed by the tightening of the bolt 14 into a lock nut 17 that remains stationary. The degree of tightening of the bolts 14 determines the spacing of the baseboard 11 above the channel 12 or 13. In this manner, the surface of the baseboard 11 can be accurately leveled with respect to a cutter bar 120, so that a cutting head 150 will be level with respect to the baseboard 11 even though the baseboard 11 may not be located on a level surface and may not be level in the absolute sense. This gives the present invention a substantial advantage over the prior art.

Another feature of the present invention is that all the parts which extend above the baseboard 11 are mounted near one end 18 of the baseboard 11 so that the other end 19 of the baseboard 11 and the two sides are free from obstructions. Therefore, a mat or sheet of glass of practically any size can be placed on the baseboard 11 and can have an oval or circle cut in it.

Figure 4:
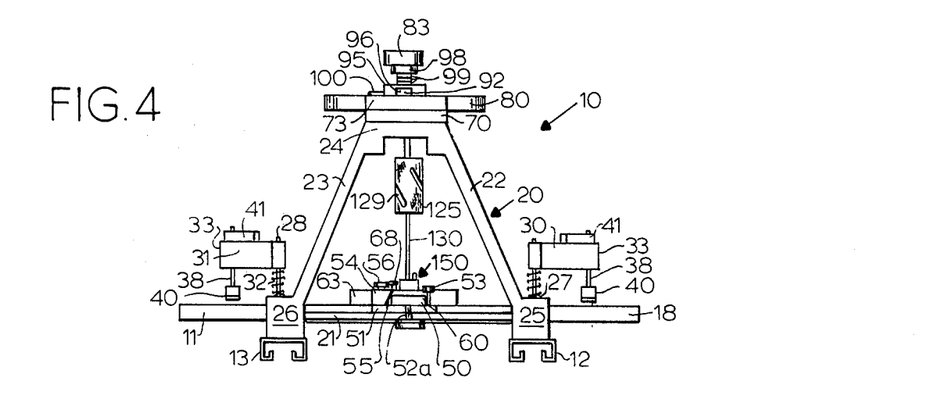
FIG. 4 is an end view of the device of FIG. 1.

Preferably, all the upper parts of the oval cutter 10 are mounted on a strong metal frame 20, which is secured, as by bolting, to one end of both channels 12 and 13, to impart additional rigidity and strength. The frame 20 may be trapezoidal in shape as viewed from the end (see FIG. 4), having a base plate 21, two inwardly and forwardly inclined upwardly-extending members 22 and 23, and an upper plate 24. Thickened and flanged portions 25 and 26 of the base plate 21 preferably lie outside the members 22 and 23. The portions 21, 22, 23, 24, 25, and 26 may all be elements of a unitary casting, or may be welded or otherwise secured together. Bolts 27 and 28 (See FIG. 1) may secure the frame 20 firmly to the base channels 12 and 13.

The bolts 28 are elongated and additionally secure to the frame 20 a pair of hold-down bars 30 and 31, with a stiff spring 32 between each bar 30, 31 and the frame flange 25, 26 to enable swiveling of the hold-down bars 30, 31 relative to the frame 20 and to the baseboard 11 and also to hold the bars 30, 31 at a height spaced above the flanges 25, 26 and the baseboard 11.

Figure 5:
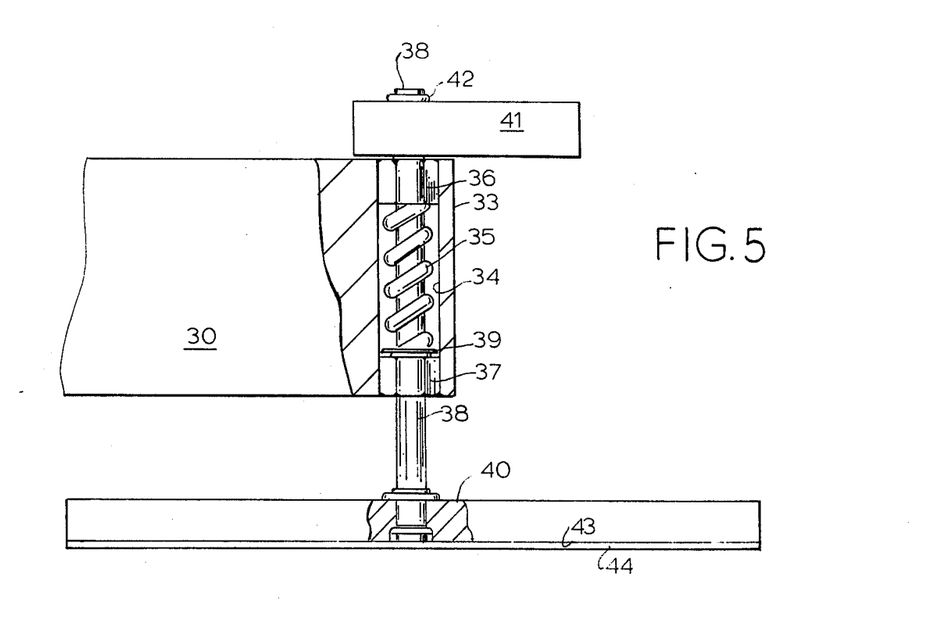
FIG. 5 is an enlarged fragmentary view in vertical section taken along the line 5—5 in FIG. 1.
Figure 6:
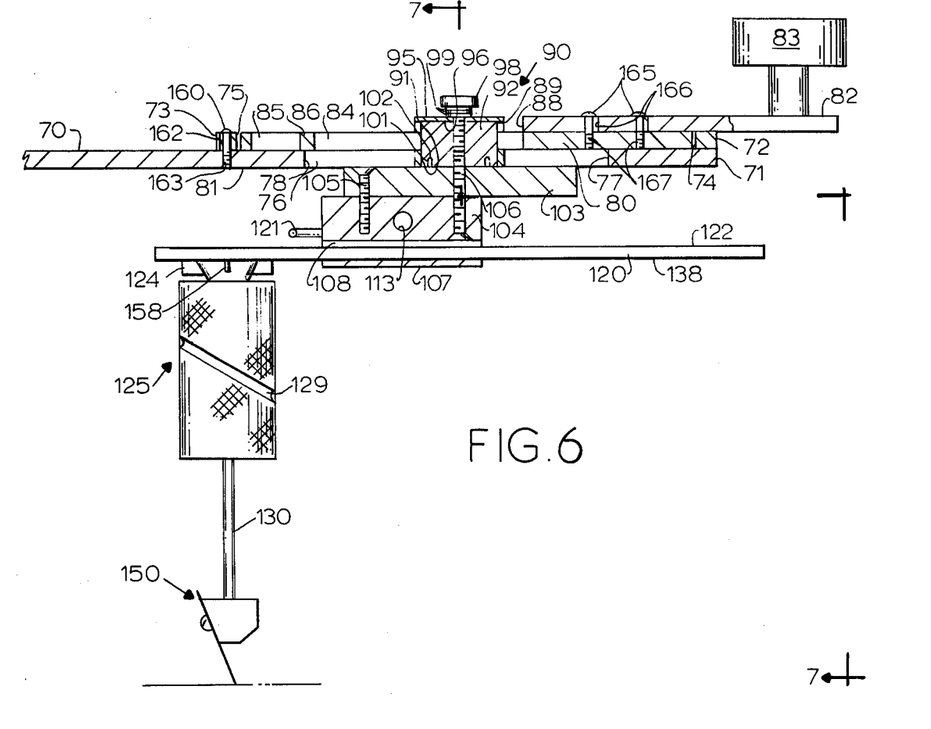
FIG. 6 is an enlarged fragmentary view in vertical section taken along the line 6—6 in FIG. 1.

As shown in FIG. 5, the outer or distal end 33 of each hold-down bar 30 or 31 has a round vertical through opening 34 in which a coil spring 35 is confined between a pair of bushings 36 and 37. A shaft 38 extends down through the opening 34 and the spring 35 and has a lock washer 39 secured therethrough that engages the lower end of the spring 35, so that when the shaft 38 is pushed upwardly the spring 35 is compressed upwardly. The shaft 38 is free to rotate relatively to the opening 34. The lower end of the shaft 38 is secured rigidly to a hold-down foot or pad 40, while the upper end of the shaft 38 extends up through a small bar 41 and is held thereabove by a lock washer 42. The foot or pad 40 is therefore mounted in swivel relation to the bar 30 or 31 and can be swung or rotated to any desired position. Moreover, the spring 35 urges the foot 40 downwardly toward and against the baseboard 11. The foot 40 preferably is provided with on its lower surface 43 with material 44 which is suitable for engagement of a mat or sheet without injury to it but in non-slipping relationship.

By using two swiveled hold-down arms 30 and 31, each with their swiveling pads 40, a great deal of versatility is achieved. Practically any size or shape of framing mat can be cut by the machine. Also, the hold-down function is kept completely separate from the cutting function. The spring hold-down action relieves the operator from using direct clamps which might actually damage the mat or glass and gives him a quick release and quick adjustment.

Another important feature of the present invention is repeated from U.S. Pat. No. 3,845,676. This is a sliding tee bar 50, shown in FIGS. 1, 2, and 4. An alignment block 51 is secured to the base plate 21 by two screws 52 and 52a. The forward screw 52 serves as a pivot while the rear screw 52a is loose, and it is tightened into place when the block 51 is positioned quite truly. The tee bar 50 is held on the block 51 by a pair of guide posts 53

(FIG. 4) and a clamping member 54 with a beveled surface 55 and a tightening cap screw 56. There is also an index guide member 57 with a pointer 58. The tee bar 50 has a shank 60 that is slidably mounted between two guide posts 53 at one side of the block 51 and the clamp member 54 and index guide member 57 on the other side. The cap screw 56 is used to clamp the tee bar 50 to the block 51 in any desired position of its sliding travel. The members 53, 54, and 57 are so located that very little play is permitted to the tee bar shank 60 and so that the tee bar 50 therefore slides in an accurately aligned fore-and-aft path along the longitudinal axis of the baseboard 11 and of the frame 20 which carries the cutting apparatus. The centering with respect to the frame 20 is more important than centering with respect to the baseboard 11, and it is done very accurately at the factory. The shank 60 carries a calibrated scale (See FIG. 1) either metric or in inches or both.

The tee bar 50 also has a crossbar 61 which is provided (See FIG. 1) with a flat end surface 62 for engaging the mat or sheet to be cut so as to align it. To the upper surface 63 of the crossbar 61 is adjustably secured a marker member 64, having a horizontal flange 65 with a slot 66 therethrough and a vertical, preferably triangular, pointer portion 67 for marking the correct center line for the mat or sheet to be cut. While the marker member 64 might be set at the factory so accurately that no adjustment would be necessary, it is preferable to enable some adjustment of the pointer 67 to take care of manufacturing tolerances that may occur in other parts of the machine, and this is done by a cap screw 68 that goes through the slot 66 and locks the member 64 in any set position along the crossbar 61.

The scale on the shank 60 preferably gives, not the length of the tee bar shank 60 nor the distance of the crossbar 61 from the frame 20, but rather the distance of the surface 62 from the center of the circle or oval to be cut. This enables the operator to make measurements quickly, because he knows where he wants the center of that oval to be, relative to the edge of his mat. Therefore, by setting the tee bar surface 62 to exactly that distance, he arrives immediately at the adjustment of the mat without having to do any calculations.

To the upper plate 24 of the frame (See FIGS. 2 and 4) is secured an horizontal bar 70 which extends back over the baseboard 11 over the longitudinal axis thereof and toward the end 19. The horizontal bar 70 is thus spaced well above the baseboard 11. At its outer end 71 is permanently secured a transverse bar 72, and spaced back from the bar 72 is a parallel transverse bar 73 (See FIGS. 1, 2, 6-8, and 11), adjustably secured. Both of these bars 72 and 73 preferably have planar facing edges 74 and 75. In between these two bars 72 and 73 is a longitudinally-extending slot 76, preferably having rounded ends 77 and 78. The slot 76 is precisely made to lie along the longitudinal axis of the bar 70, and the bar 72 is precisely perpendicular to the slot 76.

A rotatable disc 80 having a diameter equal to the distance between the two bar edges 74 and 75, is mounted in between the bars 72 and 73 and its circumferential edge 81 is tangent to the edges 74 and 75 so that it is restrained from longitudinal movement by them. On this disc 80 (See especially FIG. 11) is mounted a bar 82 which is mounted to one side of center and extends out radially beyond the edge 81, having a freely rotatable handle 83 at its distal end. Generally in line with the bar 82 and handle 83 there is a radially-extending slot 84 which is preferably narrower and shorter than the slot 76, which it overlies. This slot 84 extends from slightly to one side of center, across the center of the disc 80 and lies mainly on the opposite side of center from the handle 83. There is also, preferably, a circular opening 85 through the disc 80 to enable observation of one of the calibrated elements, as described later. Secured to an upper surface 86 of the disc 80 is a calibrated scale 87, preferably both in inches and centimeters and fractions thereof.

In combination with the disc 80 is an assembly 90, which includes a disc-shaped bearing member 91 that is mounted for both rotation and translation in the slot 76. Extending up from this bearing member 91 is an extension 92 which has a pair of parallel sides 93 and 94 (FIG. 7) that enable it to be snugly engaged in and through the radially-extending slot 84 of the disc 80. A clamp block 95 is provided with a recess 96 in its lower surface 97 to receive the extension 92. A thumbscrew 98 extends through the block 95 and is threaded into the extension 92, preferably with washers 99 between its head and the block 95. This makes it possible to lock the extension 92 in any position along the slot 84. The bar 82 itself has an end 88 against which an end 89 of the clamp block 95 engages to place the assembly 90 into the proper position for cutting a circular opening. Any movement away of the block 95 away from the edge 88 results in eccentricity in the cut, as will be explained later. The block 95 carries a calibration needle 100 for noting the degree of eccentricity on the scale 87.

The slot 84 need be only half as long as the slot 76, since the relative movement of the bearing in the extension 92 in the slot 84 is exactly half that of the bearing 91 in the slot 76. In operation, the rotation of the disc 80 is truly circular when and only when the block 95 abuts the edge 88; under that condition there is no relative movement of either the bearing 91 in the slot 76 or the bearing extension 92 in the slot 84. At all other positions of the block 95, there is eccentricity, which expresses itself partly in the fact that the bearing 91 moves back and forth a certain amount in the slot 76 when the disc 80 is rotated by the handle 83 and also in the fact that the bearing extension 92 goes back and forth half that amount in the slot 84. Also, although as a result of the restraint by the bars 72 and 73, the disc 80 does not move back and forth longitudinally of the bar 70, it does move from side to side laterally. The scale 87 enables one to set the amount of eccentricity, and the scale is preferably made to read the diametric effect of eccentricity, by making the scale marks half the effect produced — ½ inch on the scale is read as 1 inch, for example.

In order to obtain the needed leverage, the handle 83 is, as shown, in line with the slot 84 and on the opposite side of center from the main portion of the slot 84.

The rotary bearing 91 has a pair of dowel-receiving openings 101 to receive dowel-like members 102 that extend up from a depending member 103, which may be disc-shaped, although that is not essential.

Figure 7:
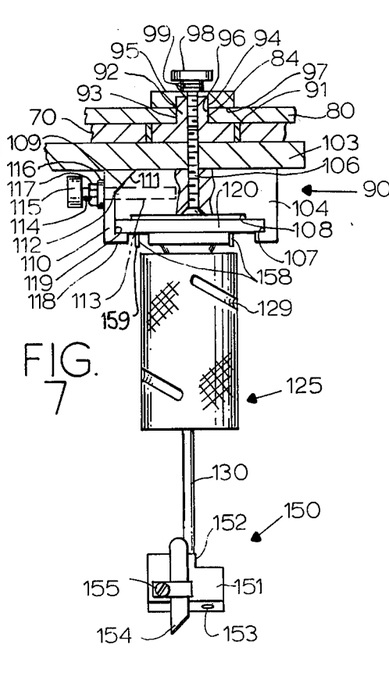
FIG. 7 is an enlarged fragmentary view in vertical section taken along the line 7—7 in FIG. 1 and FIG. 6.
Figure 8:
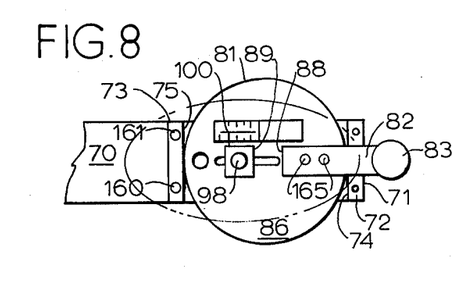
FIG. 8 is a fragmentary top plan view of the oval cutting portion of the device, on the scale of FIG. 1, showing various ovals that can be made thereby.

A clamp block 104 is secured to the bottom of the member 103 by a screw 105 and also by a large screw 106 which extends up through both the block 104 and the member 103 and is threaded into the disc bearing 91. The two screws 105 and 106 lock the members 103 and 104 together against relative rotational movement, while the dowels 101 lock the members 91 and 103 together against relative movement and assure precise alignment. The screw 106 also pulls the assembly 90 together snugly and gives precision that prevents sloppy action. The block 104 is part of a clamp assembly and therefore has a depending fixed channel portion 107 (FIG. 7). A bottom recess 108 offsets the bottom of the screw 106 upwardly. The upper corner opposite the channel portion 107 has a beveled surface 109.

A clamp member 110 (FIG. 7) has a beveled portion 111 which engages the beveled portion 109 on the block 104. Through the clamp member 110 extends an opening 112 matching a threaded tap 113 in the block 104. Through the opening 112 and into the tap 113 extends a clamping screw 114 with a head 115. A suitable washer 116 and lock nut 117 may be provided. The clamp member 110 also has a depending flange portion 118 which cooperates with the bottom edge of the block 104 to provide a second channel 119.

Sliding in the channels 107 and 119 is a cutter holder bar 120. When the screw 114 is loosened, the bar 120 is slidable relative to the block 104 and clamp 110, and when the screw 114 is tightened, the bar 120 is held in a fixed position. The block 104 is provided with a calibration needle 121 which may be an L-shaped member fitting into an opening in the block 104 and secured thereto by a suitable set screw. The bar 120 preferably bears a calibrated scale 122 that shows exactly the magnitude of the minor diameter of the oval to be cut (or the diameter of a circle when a circle is to be cut), and the scale 122 may be calibrated to read in both fractions of inches and millimeters. This scale 122 and needle 121 are visible from above through the opening 85, when the handle 83 puts the disc 80 in a certain position; at other times the reading can be made beyond the edge 81 of the disc 80.

Figure 10:
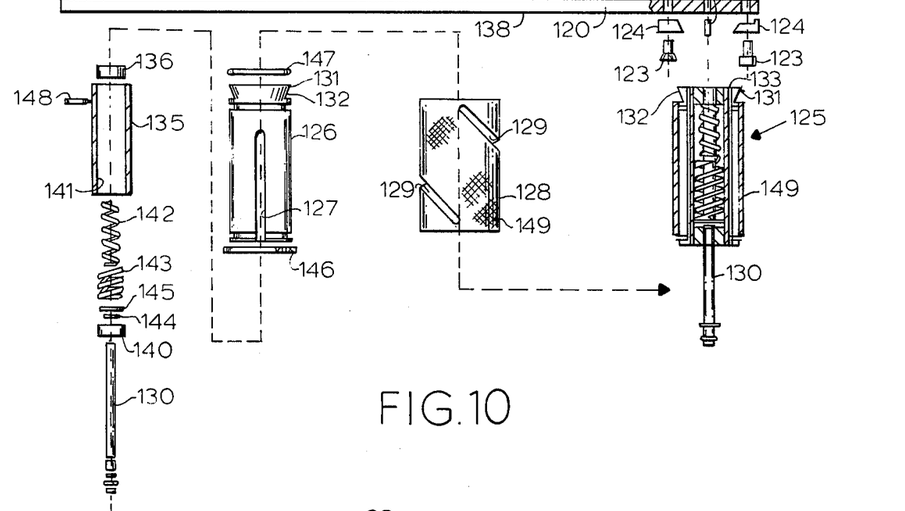
FIG. 10 is a view series in side elevation showing assembly of the cutter holder and associated parts.
Figure 11:
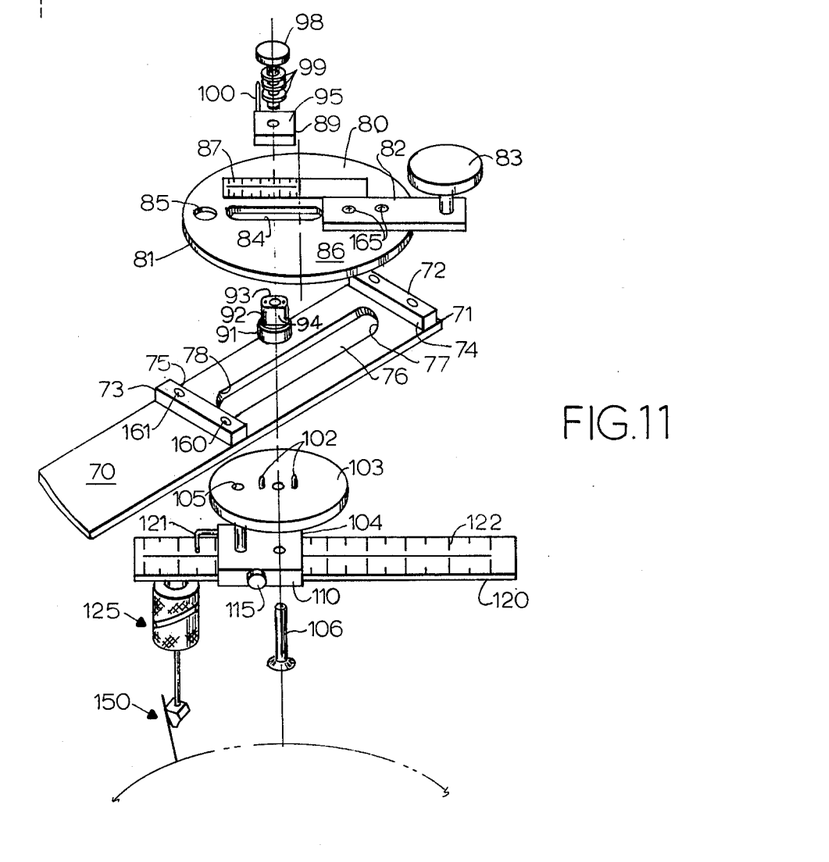
FIG. 11 is an exploded isometric view of the portion of the device relating to the oval movement of the knife.

Depending from the cutter holder bar 120 (See FIG. 10) and preferably secured thereto by screws 123 are two beveled-edge wedge members 124 (See FIG. 10) that support a cutter assembly 125. The cutter assembly 125 may include an inner sleeve 126 with a vertical slot 127 therethrough, an outer sleeve 128 with a helical slot 129, and a shaft 130. The inner sleeve 126 has an upward projection 131 with an inverted frustoconical upper end portion 132 against which the wedge members 124 are tightened to lock the cutter assembly 125 to the cutter bar 120.

It will be noted that the cutter holder bar 120 is held by the clamp 110 so that the bar 120 is parallel to the handle 83 at all times. In order to obtain an oval that has its major axis in line with the axis of the bar 70, the cutter assembly 125 is on the opposite side of center from the handle 83. If installed on the same side of center, the cutter assembly 125 will cut an oval transverse to the axis of the bar 70, and this is not usually desired, though it can be done. In either event, the cutter holder bar 120 is in line with the slot 84 and the handle 83. Preferably, as shown, the clamp 110 is held off center, to shift the scale outwards where it can be read more easily.

Inside the hollow sleeve 126 is a spring housing 135. An upper bushing 136 is centered by a pin 137 and bears against the bottom 138 of the cutter bar 120, and a lower bushing 140 closes the bottom of the cylindrical bore 141 of the spring housing 135. Between the bushings 136 and 140 a coil spring 142 is compressed. Around the coil spring 142 is a shorter coil spring 143.

The shaft 130 extends up through the inner spring 142 and has a snap ring 144 supporting a washer 145 that bears on the upper end of the outer spring 143. The spring housing 135, after assembly with the springs 142 and 143 and the shaft 130, is then put into the inner sleeve 126, where it is secured by a snap ring 146. There is an O-ring 147 atop the inner sleeve 126. A guide pin 148 secured to the spring housing 135 projects out through the slot 127.

This assembly is then put into the outer sleeve 127, which has a knurled outer surface 149. The snap ring 146 on the shaft 130 holds the outer sleeve 127 in place, and the index pin 148 extends through both slots 129 and 128 and is secured to the spring housing 135. Thus, when the inner sleeve 126 is fixed in place, the knurled outer sleeve 127 is turned to project or retract the shaft 130.

The lower portion of the shaft 130 has suitable snap rings and O-rings for support of a knife assembly 150.

Figure 9:
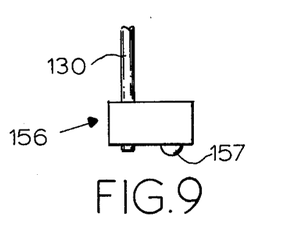
FIG. 9 is a fragmentary view in side elevation of a glass-cutting attachment for the device.

The knife assembly 150 is like that shown in my earlier U.S. Pat. No. 3,845,676. The knife assembly 150 includes a detachable knife-holding block 151 having two alternate openings 152 and 153 for mounting the block 151 to the shaft 130. One opening 152 is used for holding a knife blade 154 vertically, and another opening 153 is used for holding it at an angle. The knife blade 154, held in place by a screw 155, may be of standard replaceable type obtainable at any art supply store, and this is extremely desirable. The cutter assembly block 151 thus has two sockets 152 and 153 enabling easy emplacement and removal, and it is designed to come off for replacement by a glass cutter 156 having a glass-cutting wheel 157 (See FIG. 9) when it is desired to use a glass cutter.

The block 15 is held on the shaft 130 so that it can swivel as the cut is made, enabling the knife blade 154 or glass cutter 156 to find its own proper approach angle. If desired, a pencil, pen, or embossing tool may be substituted for the knife.

Due to the necessary distance of the cutting blade 154 behind the cutter shaft 130, especially when the blade 154 is held at an angle in order to give a more pleasing beveled appearance for most mat cuts, there is a small degree of variation on small ovals and circles—this is referred to as "trailing action." This trailing action is similar to a truck and trailer in a tight turn—the trailer follows a tighter path than does the truck. When a precise size must be kept, it is advisable to make a preliminary test cut on scrap material to determine any size variance, and settings may then be adjusted accordingly. There is a difference when cutting the same size openings with a straight cut from that obtained with a bevel cut, and this can be adjusted for in the device of the present invention.

Because of the necessary trailing action, adjustment is necessary to avoid lazy ovals (ovals which lean off vertical center), especially with small ovals. Trailing action is inherent in oval-cutting machines, where the blade must be pulled to cut. This problem is overcome by advancing the cutter assembly.

Using an Allen wrench, a cap screw 123 is loosened and the cutter assembly 125 moved laterally of the bar 120, away from a zero advance pin 158. The cap screw is then tightened with the cutter assembly 125 in an advance setting position. A limit pin 159 is provided at the maximum possible advance setting and prevents accidental removal of the assembly 125.

The structure described above enables precision to be achieved without undue expense. For example, it is important to be able to have the cutter knife 154 and the cutter head 125 remain parallel to the baseboard 11 during operation, which means during rotation of the disc 80. To accomplish this, the casting for the frame 20 is made with the upper surface of the base plate 21 flat, so that it can serve as a plane of reference. Then, using it as a plane of reference, a reasonably good casting can have the lower surfaces of the flanged portions 25 and 26 machined to lie exactly parallel to the reference plane, and the upper surface of the upper plate 24 is similarly machined. With these three surfaces true and parallel to each other, the remaining requirements are for the bar 70 to be flat and straight and for the disc 80 to be flat. Any remaining discrepancy in parallel-ness between the cutter assembly 125 and the baseboard 11 can be compensated for by loosening or tightening the bolts 15.

Similarly, precision is required as to the tee bar 50. This is done by making the block 51 accurately and by making the crossbar 61 truly perpendicular to the shank 60. The slot 76 and the outboard transverse bar 72 are made precisely perpendicular, and the slot 76 is carefully milled. Then it can be used as a reference in connection with a rectangular bar (not shown) which is inserted vertically through the slot 76 before the disc 80 and assembly 90 are installed. This bar is long enough to be held snugly in the slot 76 and still reach the baseboard 11, which has by this time already been adjusted as stated in the preceding paragraph. The tee bar 50 is then installed in its block 51 and set in place in a position where the rear screw 52a is exposed. With this screw 52a loose, the block 51 is adjusted to a true position, and the screw 52a is then tightened to assure accurate fore-and-aft movement of the tee bar 50. Then the accuracy of the position of the pointer 67 is checked and adjusted if necessary by the cap screw 68.

To provide smooth operation, a low-friction plastic may be applied to certain surfaces. For example, tetrafluoroethylene is preferably applied to the surface of the transverse bars 72 and 73 that engage the periphery 81 of the disc 80. Also, the upper and lower surfaces of the bar 70 are so coated in the areas to be in contact with the lower surface of the disc 80 and the upper surface of the disc 103, and those surfaces, too, may be so coated. These coatings make it feasible to have the assembly 90 quite tight and to have it mounted tightly on the bar 70 and still operate easily.

The coating, however, does add a new tolerance, and to provide precision, the bar 72 is installed to be truly perpendicular to the bar 70, but the transverse bar 73 is adjustable within certain limits. For this purpose, the bar 73 may be held on the bar 70 by a pair of machine bolts 160 and 161 installed up from below the bar 70 through oversize openings 162 there and threaded into openings 163 in the bar 73. With the disc 80 in place and bearing against the bar 72, the disc 80 is rotated to one lateral extremity of its path and the bolt 160 at that extremity tightened with the bar 73 in good snug contact. The bolt 160 then becomes a pivot for the bar 73, as the disc 50 is rotated to its other extreme position, at which the bolt 161 is tightened into a position that results in snug contact of the bar 73 with the periphery 81 at all points of travel.

To assure precision of location of the line at which the clamp block 95 engages the edge 88, the bar 82 is also made adjustable relative to the disc 80. Two screws 165 extend through two longitudinal slots 166 in the bar 82 into threaded openings 167 in the disc 80. Thus the edge 88 can be precisely located at the point where the block 95 is at the position of zero eccentricity.

Moreover, the rotary action relied on in this invention avoids the play that is more difficult to avoid with a reciprocating system, and this, too, aids in achieving precision.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An oval-cutting assembly including in combination:
    a flat elongated frame member having a pair of parallel transverse members and a longitudinal through slot in between them,
    a circular disc in between and tangent to said transverse members and having a radially extending through slot lying mainly to one side of the disc's center and a handle rigidly secured eccentrically to said disc on the other side of the disc's center,
    a rotatable disc-shaped upper bearing rotatably and slidably mounted in said longitudinal slot and having a flat face with a non-circular extension therefrom that fits non-rotatably but slidably in said radially-extending slot, said circular disc resting on said flat face,
    a rotatable lower bearing member keyed to said upper bearing for rotation therewith and bearing rotatably on the bottom of said frame member,
    clamp means for clamping said extension to said disc at a selected position in said radially-extending slot to provide a chosen amount of eccentricity,
    cutter holder means,
    attachment means securing said cutter holder means to said lower bearing member for rotating said cutter holder means and moving it longitudinally with said upper bearing,
    a cutter assembly including a cutter blade, spring means for yieldably urging said blade against any object to be cut, and a cutter holder bar,
    means for rigidly securing said cutter holder bar to said cutter holder means, and
    means for setting said cutter holder bar at a chosen position relative to said cutter holder means to determine the minor diameter of said oval.

2. The oval-cutting assembly of claim 5 incorporating.
    first scale means associated with said cutter holder means and said cutter holder bar for determining and indicating the minor diameter of said oval, and
    second scale means associated with said disc and said clamp means for setting and indicating the eccentricity of said oval.

3. The oval-cutting assembly of claim 1 wherein one of said pair of parallel transverse members is adjustable in position so that wear between said disc and said transverse members can be compensated for.

4. The oval-cutting assembly of claim 1 wherein said cutter assembly comprises:
    a shaft,
    a knife-holding block secured removably to said shaft,
    a knife removably secured to said block,
    a sleeve member secured to said cutter holder bar,
    support means in said sleeve member cooperating with said spring means for yieldably supporting said shaft, and retraction and advancing means for moving said support means relatively to said sleeve member for projecting and retracting said shaft.

5. An oval-cutting assembly including in combination:
- a flat elongated frame member having a pair of parallel transverse members and a longitudinal through slot in between them,
- a circular disc in between and tangent to said transverse members and having a radially extending through slot lying mainly to one side of the disc's center and a handle rigidly secured eccentrically to said disc on the other side of the disc's center, in line with said radially-extending slot,
- a rotatable disc-shaped upper bearing rotatably and slidably mounted in said longitudinal slot and having a flat face with a non-circular extension therefrom that fits non-rotatably but slidably in said radially-extending slot, said circular disc resting on said flat face,
- a rotatable lower bearing member keyed to said upper bearing for rotation therewith and bearing rotatably on the bottom of said frame member,
- first clamp means for clamping said extension to said disc at a selected position in said radially-extending slot to provide a chosen amount of eccentricity,
- second clamp means on the opposite side of said frame member from said disc and rotating with said lower bearing member,
- a cutter holder bar slidably mounted in said second clamp means and settable to a chosen position therein to determine the minor diameter of said oval, and
- a cutter assembly rigidly secured to said cutter holder bar and including a cutter blade, spring means for yielding urging said blade against any object to be cut.

6. The oval-cutting assembly of claim 5 having means for adjusting the lateral position of said cutter assembly relative to said cutter holder bar between two fixed stops to determine the amount of trailing action of said cutter blade.

7. The oval-cutting assembly of claim 5 wherein said disc has a through opening in line with said slot for enabling viewing the position of said cutter holder bar relative to said second clamp means.

8. The oval-cutting assembly of claim 5 having means for adjusting one of said transverse members, the other one being fixed, to assure snug and correctly aligned engagement of said disc by both said transverse members.

9. The oval-cutting assembly of claim 5 having scale means on said cutter holder bar and index means on said second clamp means for reading the position of said cutter holder bar relative to said second clamp means.

10. The oval-cutting assembly of claim 9 having scale means on said disc and index means on said first clamp means for reading the position of said bearing relative to said radially-extending slot.

11. The oval-cutting assembly of claim 5 having
- a limiting member on said disc in line with said radially-extending slot and transverse with respect thereto,
- said first clamp means having an edge that can be abutted against said limiting member and when abutted holds said bearing in a position where the eccentricity is zero, and the assembly when operated then cuts a circle.

12. The oval-cutting assembly of claim 11 having means for adjusting said limiting member on said disc to achieve precision as to the proper location for obtaining zero eccentricity upon engagement with said first clamp means.

13. An oval-cutting assembly including in combination:
- a flat elongated frame member having a pair of parallel transverse members and a longitudinal through slot in between them,
- a circular first disc in between and tangent to said transverse members and having a radially-extending through slot lying mainly to one side of the disc's center and a handle rigidly secured eccentrically to said disc on the other side of the disc's center and aligned with said radially-extending slot,
- a rotatable disc-shaped circular upper bearing rotatably and slidably mounted in said longitudinal slot and having a flat face with a non-circular extension therefrom having two parallel faces that fits non-rotatably but slidably in said radially-extending slot, said circular disc resting on said flat face, whereby said disc moves from side-to-side along said frame member as it is rotated but is restrained from longitudinal movement,
- a rotatable lower bearing member keyed to said upper bearing for rotation therewith and bearing rotatably on the bottom of said frame member,
- first clamp means for clamping said extension to said disc at a selected position in said radially-extending slot to provide a chosen amount of eccentricity,
- a second disc secured to said upper bearing on the opposite side of said bar from said first disc and rotating with said upper bearing, so that it moves longitudinally as said first disc rotates but does not move laterally,
- second clamp means secured to said second disc and rotating with it,
- a cutter holder bar slidably mounted in said second clamp means parallel with said radially-extending slot and settable to a chosen position therein to determine the minor diameter of said oval, and
- a cutter assembly rigidly secured to said cutter holder bar on the opposite side of the center of said first disc from said handle, and including a cutter blade, spring means for yieldably urging said blade against any object to be cut.

14. The oval-cutting assembly of claim 13 wherein said disc has a through opening in line with said radially-extending slot for enabling viewing the position of said cutter holder bar relative to said clamp means.

15. The oval-cutting assembly of claim 13 wherein the frame member has two surfaces, one in contact with said first disc and one in contact with said second and these surfaces and the disc surfaces in contact therewith are coated with a low-friction plastic, as are the surfaces of the transverse members that are in contact with the first disc.

16. A device for cutting ovals or circles in sheet material, including in combination:
- a baseboard having a first end and a second end and a pair of said edges,
- a frame secured to said baseboard and having a portion adjacent to the first end of said baseboard providing a base plate and upright frame support means having at an upper portion thereof, the second end and side edges being unimpeded, an horizontal frame member extending longitudinally over and parallel to said baseboard toward said second end and midway between said side edges, said frame member having a pair of parallel transverse members and a longitudinal slot through said frame member in between them, hold-down means swivel-mounted to said base plate and having swivel-mounted hold-down pad means, a tee bar having a scaled flat shank portion parallel to said horizontal frame member slidably mounted centrally to said base plate for movement over said baseboard parallel to said horizontal frame member toward said second end and having a crossbar with a center index line, a circular disc in between and tangent to said transverse members and having a radially-extending slot lying mainly to one side of the disc center and a handle rigidly secured to said disc on the other side of the disc center in line with said radially-extending slot, an oval-generating assembly including a rotatable disc-shaped upper bearing rotatably and slidably mounted in said longitudinal slot and having an upper flat face with an extension therefrom that fits non-rotatably but slidably in said radially-extending slot, said circular disc resting on said flat face, a rotatable lower bearing member keyed to said upper bearing for rotation therewith and bearing rotatably on the bottom of said frame member, first clamp means for setting said extension and clamping it to said disc at a selected position in said radially-extending slot to provide a chosen amount of eccentricity, second clamp means secured to and depending from said lower bearing member, a calibrated cutter holder bar slidably mounted in said second clamp means and settable to a chosen position therein to determine the minor diameter of said oval, and a cutter assembly depending from and rigidly secured to said cutter holder bar, said cutter assembly including a cutter blade, spring means for yieldably urging said blade against any object to be cut.

17. The device of claim 16 wherein said frame includes a pair of parallel base members, a set of screws for securing said baseboard to said parallel base members, and a set of conical coil springs around said screws and interposed between said baseboard and said base members, whereby the cutter assembly can be made accurately parallel to said baseboard.

18. The device of claim 16 having means for adjusting the position of said tee bar to assure its being parallel to and in alignment with said horizontal frame member.

19. The oval-cutting assembly of claim 13 wherein said two parallel faces of said upper bearing member are at all times parallel to said cutter holder bar.

20. The oval-cutting assembly of claim 1 wherein said attachment means comprises a central axial screw and an off-center member matching with an opening.

* * * * *

UNITED STATES PATENT AND TRADEMARK OFFICE
CERTIFICATE OF CORRECTION

PATENT NO. : 4,112,793
DATED : September 12, 1978
INVENTOR(S) : Donald Cameron Pierce It is certified that error appears in the above-identified patent and that said Letters Patent are hereby corrected as shown below:

Column 5, line 44, after "frame" insert --20--.
Column 10, line 46 as counted from top of column, which is line 1 of claim 2, "claim 5" should read --claim 1--
Column 11, line 35 as counted from top of column, which is the next-to-last line of claim 5, "yielding urging" should read --yieldably urging--.
Column 12, line 52, which is the last line of claim 14, "said clamp means" should read --said second clamp means--.
Column 12, line 55, which is line 3 of claim 15, "said second and" should read --said second disc, and--.
Column 12, line 63, which is line 4 of claim 16, "said edges" should read --side edges--.

Signed and Sealed this

Fifth Day of December 1978

[SEAL]

Attest:

RUTH C. MASON
Attesting Officer

DONALD W. BANNER
Commissioner of Patents and Trademarks